Aug. 26, 1941. W. W. PEARSON 2,254,046
CUTTING MACHINE
Filed June 15, 1938 5 Sheets-Sheet 1
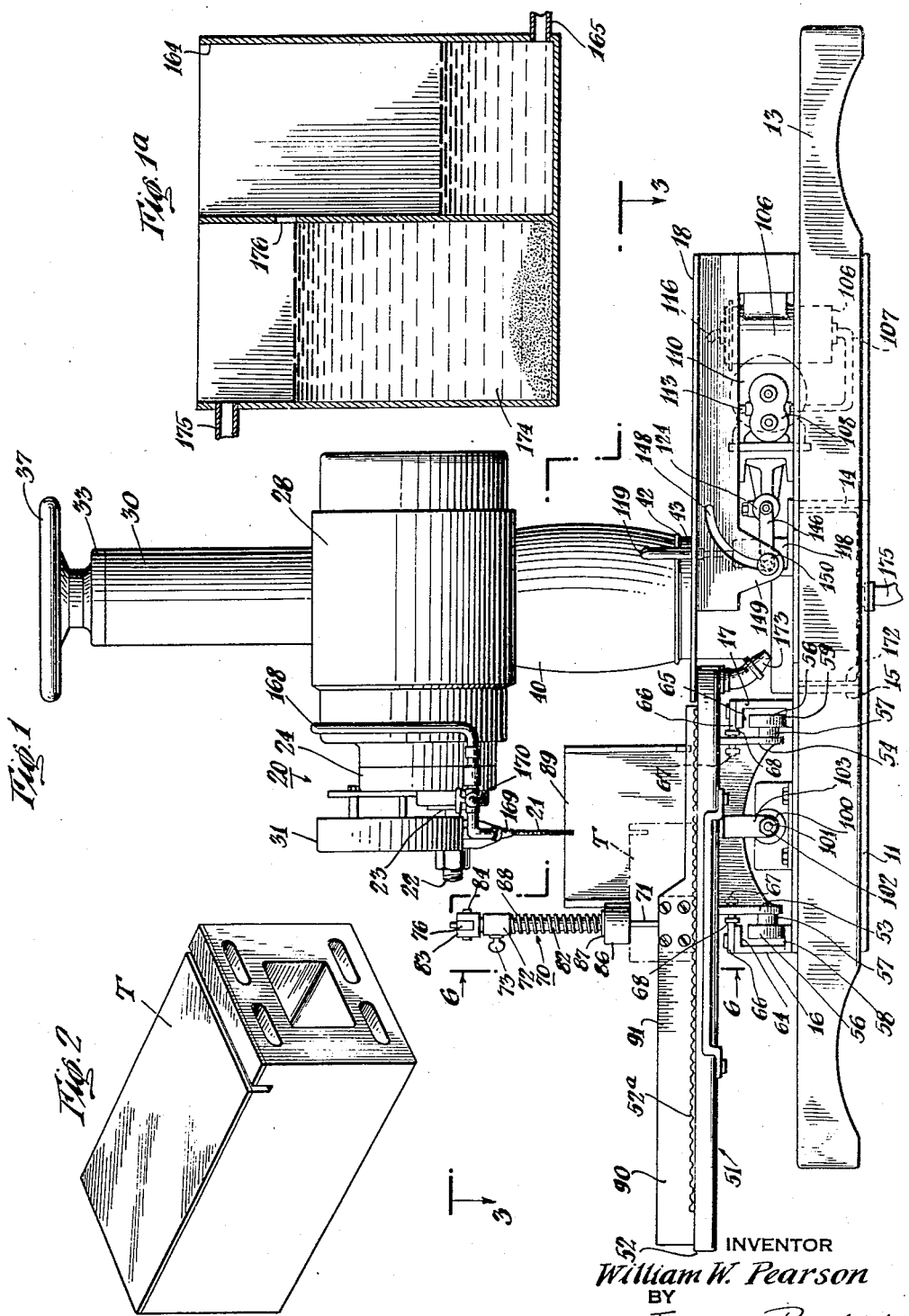
INVENTOR
William W. Pearson
BY
his ATTORNEY

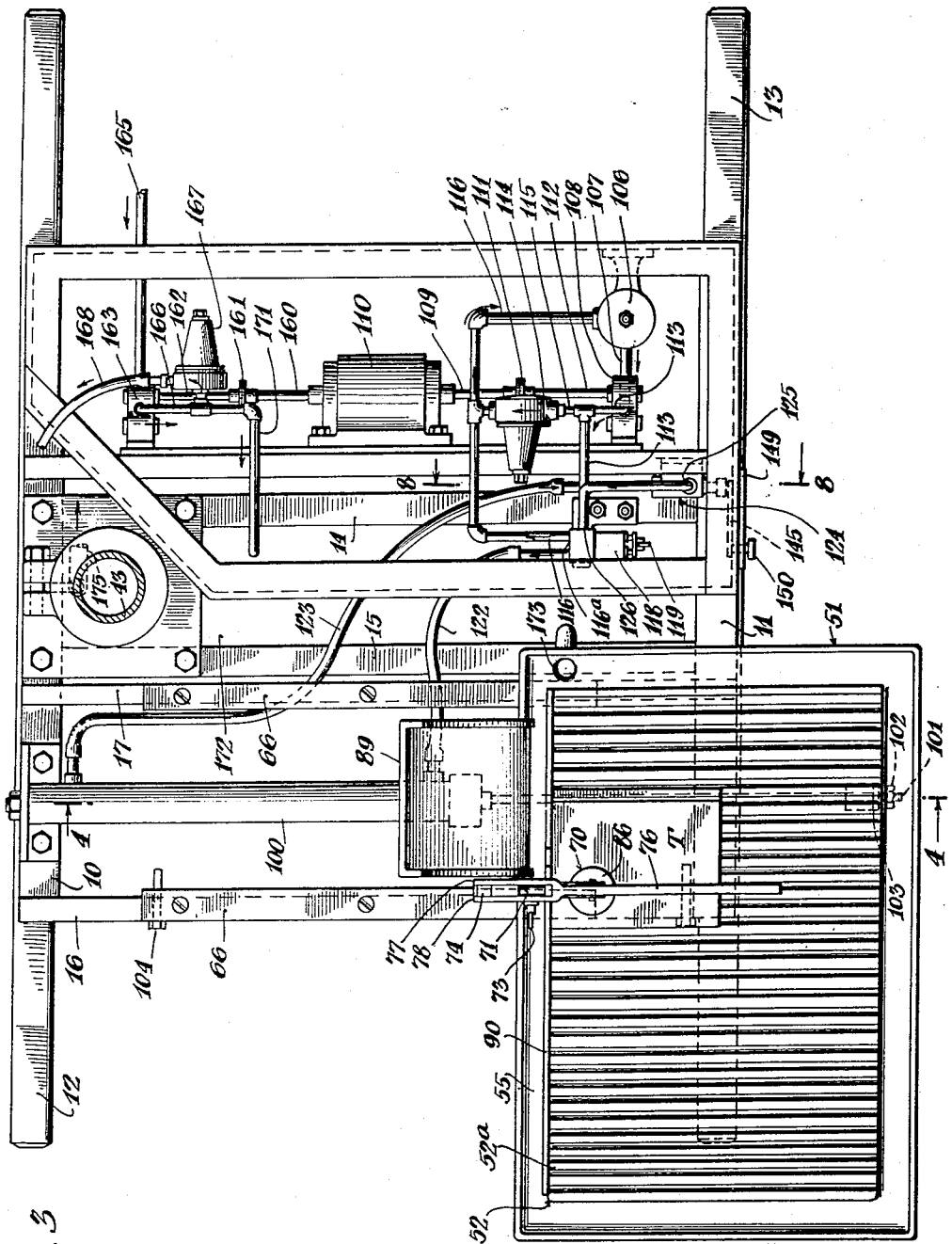

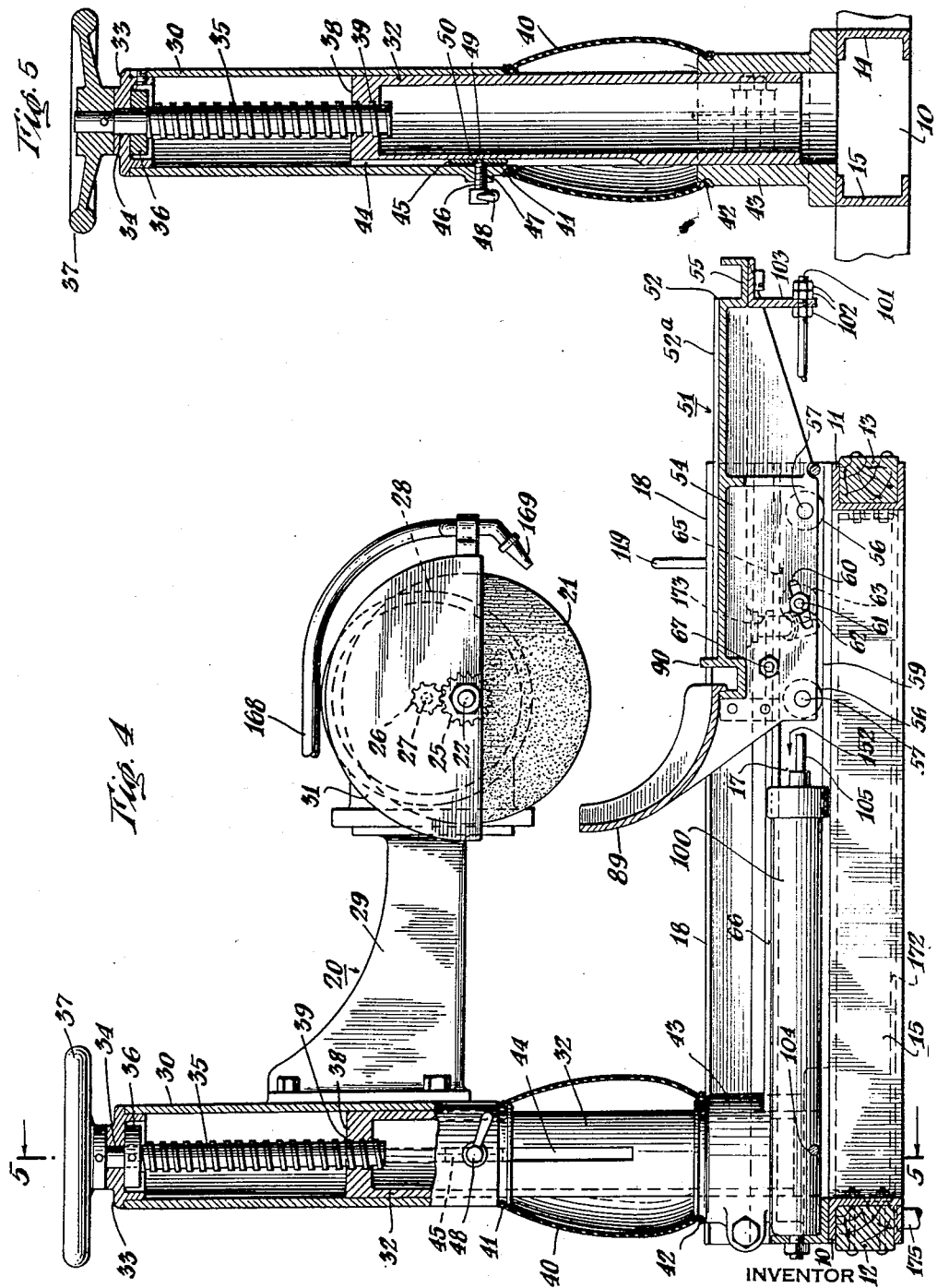

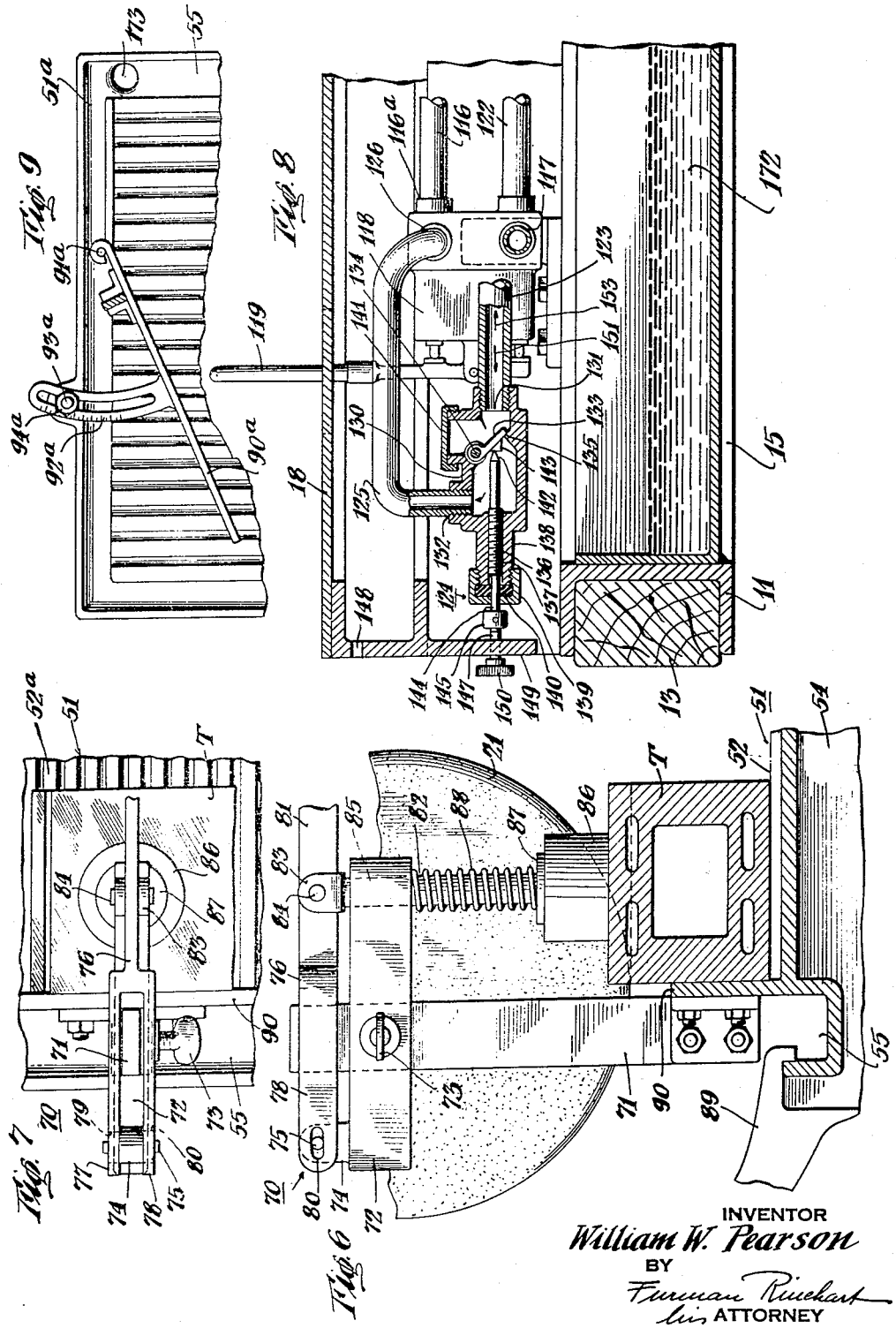

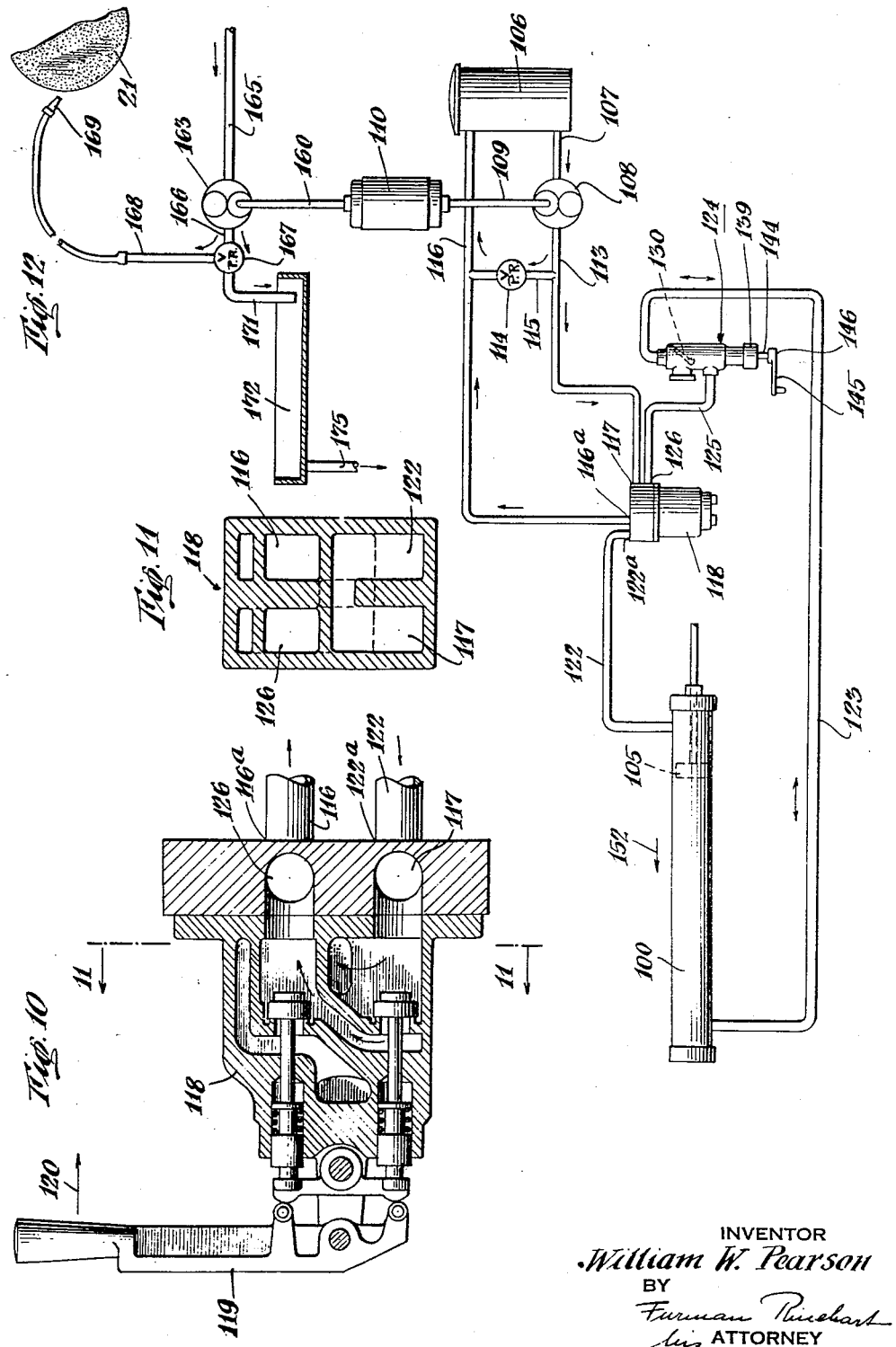

Patented Aug. 26, 1941

2,254,046

UNITED STATES PATENT OFFICE 2,254,046

CUTTING MACHINE

William W. Pearson, Rahway, N. J.

Application June 15, 1938, Serial No. 213,749

5 Claims. (Cl. 125—13)

This invention relates to cutting machines and generally to machines used for sawing or cutting tile and the like. More particularly, the invention relates to improvements in machines of that class in which the tile to be cut is placed upon a movable carriage and fed toward a rotating cutter which saws a groove through the surface of the tile along which the tile may then be conveniently divided.

According to the invention, improved construction in machines of this character is provided in that a tile cutting machine may be constructed in compact light form for easy portability without sacrificing rigidity. Means are provided for automatic variable speed control of the carriage or platen upon which the work piece to be cut is carried past the rotary cutter. Also, means are provided for vertical adjustment of the cutting edge of the rotary cutter relative to the work piece which may be held in proper position during the cutting operation by a quickly releasable and readily adjustable hold-down device.

Under modern construction methods and design the use of faced tile for partitions and walls is increasingly expanding. At the present time, particularly on large buildings where partitions and walls are constructed or faced with tile, it is usually more economical for the contractor to purchase tile of standard sizes.

In cases where the standard sizes must be cut to meet existing conditions, the tile is cut on the job as the work proceeds. Accordingly, it is desirable to have a machine which may be easily moved. At the same time the machine should be rapid in operation without lost motion and easily adjustable since the average job requires cutting the tile in innumerable sizes for proper fitting into the various odd sized spaces encountered. Furthermore, finished edges of the cut tile should be such as to conform to the finished edges of the standard uncut sizes to avoid unsightly joints and to add to the aesthetic appearance of the finished job. The present invention accomplishes the foregoing desirable results, in addition to others more specifically mentioned hereinafter.

Moreover, a machine of the character herein contemplated should not, when operated, produce dust that becomes dispersed in the atmosphere surrounding the workmen, since tile dust is often of such nature as to cause silicosis if workmen labor in such a dust laden atmosphere. Provision is made, according to the present invention, to avoid this very undesirable consequence.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which Fig. 1 is a front view in elevation of the machine;

Fig. 1a is a view in cross-section of a settling tank;

Fig. 2 is a view in perspective in larger scale of a typical tile after sawing;

Fig. 3 is a view on line 3—3 of Fig. 1;

Fig. 4 is a view in elevation and partly in section on line 4—4 of Fig. 3;

Fig. 5 is a view on line 5—5 of Fig. 4;

Fig. 6 is a side view in elevation of the tile hold-down device, on line 6—6 of Fig. 1;

Fig. 7 is a top plan view of the tile hold-down device;

Fig. 8 is an enlarged view partly in cross-section of a variable flow check valve of the oil circulating system on line 8—8 of Fig. 3;

Fig. 9 is a view in plan of a modified form of back stop;

Fig. 10 is a view in cross-section of a four-way operating valve of the oil circulating system;

Fig. 11 is a view on line 11—11 of Fig. 10; and

Fig. 12 is a diagrammatic representation of the oil and water circulating systems.

To explain the principle of machines contemplated by this invention, certain specific apparatus is hereinafter described illustrating a preferred embodiment which has been constructed and made available to the trade. Various details are identified by specific names for convenience, but they are intended to be as generic in their application as the state of the art will permit. Like reference characters denote like parts in the several figures of the drawings.

Referring to the drawings, the machine is mounted on a pair of steel channels 10 and 11 having bolted thereto a pair of wooden handles 12 and 13 to facilitate carrying the machine manually from place to place. The main steel channels 10 and 11 are connected with suitable cross channels, two of which are shown in Fig. 5 at 14 and 15. Two cross channels 16 and 17 not only serve to give additional rigidity to the base assembly, but have a further function to be described in more detail hereinafter.

The rotary cutter assembly or head, designated generally by reference character 20, comprises a rotary circular saw 21 mounted on a shaft 22 journaled at 23 in motor casing 24 mounted on an arm 29. Circular saw 21 may be of "carborundum" suitably bonded. A circular blade approximately fourteen inches in diameter and approximately one-eighth inch thick and made of material known in the trade as "resinol," has been found to operate very satisfactorily. Fixed to the shaft 22 is a gear 25 meshing with a gear 26 fixed to the armature shaft 27 of an electric motor 28. The motor 28 is mounted on a laterally extending arm 29 fixed to a vertically adjustable hollow sleeve 30. It will be noted that shaft 27 is offset from shaft 22 which permits of lowering the cutting blade 21, particularly when the blade wears away from usage, without interference of the motor casing with tile being cut on the machine. A guard 31 for the rotary blade 21 is fixed also to the motor casing 24.

The sleeve 30 supporting the arm 29 to which the motor 28 is attached is slidably mounted on a hollow pillar 32. The upper end 33 of the sleeve 30 is provided with an opening 34 to accommodate a jack screw 35 having keyed thereto an annular flange 36 and a handle wheel 37. The upper end 38 of hollow pillar 32 is provided with an opening 39 threaded to receive the jack screw 35. Consequently, upon turning the wheel handle 37 the sleeve 30 may be caused to be raised and lowered as desired, which in turn permits of vertical adjustment of the motor 28 and rotary blade 21.

The lower end of the hollow pillar 32 is supported and fixed on the base channels 12, 14 and 15. A flexible leather boot 40 is fixed at its upper end 41 to the lower end of sleeve 30 and at its lower end 42 to a collar 43 clamped and fixed on the base of the machine. This boot prevents dirt or dust from contacting the bearing surfaces of the sleeve 30 and pillar 32.

The pillar 32 is provided with a key way 44. A key 45 fitting therein engages a screw 46 extending through a threaded opening 47 in the sleeve 30. A handle 48 fixed to the screw facilitates turning the screw. It will be observed that the screw 46 has a pintle 49 extending into an opening 50 in the key. This arrangement permits of locking the sleeve and prevents it from rotating and likewise provides a means for maintaining the motor and rotary saw 21 free from undue vibration in proper position when it is adjusted to desired height. Moreover, the key 45 may be easily unlocked to permit of quick adjustment of the saw 21 to any desirable height. Thus, the rotary saw 21 may be adjusted for any tile thickness or for any desired depth of cut in the tile being handled in the machine.

A laterally movable platen or carriage, designated generally by reference character 51, is provided. This carriage comprises a work supporting top 52 which may be cast aluminum or other suitable material, having downwardly extending leg members 53 and 54. The work supporting surface 52a of the carriage top 52 is grooved or rabbeted so that water or other cooling liquid used in the cutting operation will drain into the trough 55 provided around the work supporting surface 52a.

The carriage is supported on wheels which ride in the channels 16 and 17. Wheels 56 mounted to rotate on shafts 57 fixed to the leg members 53 and 54 ride on the inner surfaces 58 and 59 of the lower flanges of channels 16 and 17. These wheels carry the weight of the carriage. In addition to the four wheels 56 which support the weight of the carriage, there is provided in each of the leg members 53 and 54 a diagonal slot 60 through which extend adjustably and fixedly mounted shafts 61. These shafts 61 may be clamped in the slots by means of nuts 62. Mounted for rotation on each of the shafts 61 are wheels 63 which are adjusted to contact and roll on the inner surfaces 64 and 65 of the upper flanges of the channels 16 and 17. By means of these vertically adjustable wheels 63 the carriage may be moved back and forth on the trackways thus provided by the channels without any undesirable play.

To prevent undesirable side play or "shimmying" of the carriage, a brass rail 66 is provided for each of the upper webs of the channels 16 and 17, and bolts 67 extending through the leg members 53 and 54 are adjusted so that their end surfaces 68 will contact and ride along the edges of the brass rails 66 which provide bearing surfaces.

It will now be apparent that provision is made for adjusting the carriage to prevent up and down and sidewise play and in the event that these parts become worn by use, the arrangement just described makes possible for ready adjustment so that the carriage will always operate without undue vibration. This is important since in light machines there is likelihood of undue vibration being transmitted to the work piece which not only inhibits proper cutting but also has a bad effect upon the cutting saw and may result in its breakage. The foregoing described arrangement of the platen or carriage avoids this undesirable result.

Fixedly mounted on the carriage 51 is a holddown device designated generally by the reference character 70. It comprises a vertically extending stanchion 71 and a slotted, horizontally extending arm 72 which is slidably mounted on the stanchion (see Fig. 6). It is provided with a set screw 73 by means of which the arm 72 may be clamped to said stanchion 71 at any desirable height.

A lug 74 extending upwardly from said arm 72 having extending therethrough a bolt 75 provides means for pivoting a bifurcated lever 76. The bifurcated ends 77 and 78 of the lever 76 are provided with slots 79 and 80 through which the bolt extends. It will be noted that this lever straddles the stanchion 71 and the free end portion 81 of the lever 76 has a downwardly extending rod 82 which is connected to the lever by a yolk 83 and bolt 84. This rod 82 extends through an opening 85 in the arm 72. Its lower free end is fixed to a tile contacting pad 86 which may be of any suitable material, such as rubber. An annular flange 87 fixed to the rod 82 provides a shoulder for supporting a coil spring 88. The upper end of the coil spring rests against the lower surface of the arm 72. This spring normally urges the pad 86 downwardly against the tile T placed on the carriage 51. It will be observed that the vertical adjustment feature of the hold-down clamp 70 provides for accommodating any thickness of tile. When adjusted for any given thickness of tile it is then a simple matter to insert and remove tile to be cut in its proper position since all that is required is to lift the lever handle 81 with sufficient force to compress the spring 88. When a tile is in place the spring is of sufficient force to hold it in place during the cutting operation.

The carriage 51 is also provided with a splash guard 89. A back stop 90 which has a graduated scale 91 provides a buttress against which tile may be rigidly held on the work surface 54 of the carriage 51. It will be noted that a modified form of back stop 90a (Fig. 9) may be used. This is desirable in some instances because it facilitates angular sawing. It comprises a back stop 90a pivoted to the carriage 51a at 91a and having an arcuately slotted arm 92a engaging a bolt 93a fixed to the carriage and a clamping nut 94a.

The carriage 51 may be operated to and fro automatically by means of an oil operated piston and cylinder. The cylinder 100 is fixed to the frame underneath the carriage. The free end 101 of the piston rod is fixed to the carriage as by nuts 102 screwed on the end of the rod extending through a downwardly extending lug 103 of the carriage. A bolt 104 may serve as a stop to limit the inward movement of the carriage 51 and a like bolt (not shown) at the opposite end of channel 16 may serve as a stop to limit the outward movement. Or, the stroke of the piston 105 may be regulated for desired limited lateral movement of the carriage.

Provision is made in the oil circulating system for relatively slow or speed controlled inward movement of the carriage during cutting and a rapid return after the cutting operation. The oil operates in a closed system (see Fig. 3 and Fig. 12). Oil is drawn from storage pot 106 through conduit 107 into the intake side of a rotary pump 108 which is driven by armature shaft 109 of the electric motor 110 fixed to the frame of the machine, through clutch 111 engaging the drive shaft 112 of the oil pump 108. The oil is discharged into conduit 113. A pressure regulator valve 114 in conduit 115 is connected with the conduit 113 and the return conduit 116 which is connected with the storage pot 106. The oil passes through conduit 113 into a port 117 of a fourway hand controlled operating valve 118. This type of operating valve is well known and is arranged to be operated by a hand lever 119 extending above the cover plate 18. The exhaust port 116a of the valve 118 is connected by conduit 116 returning to the storage pot.

When the hand lever 119 is moved toward the rear of the machine (in the direction of arrow 120, Fig. 10) the oil passes through port 117 of the valve 118 through the valve and thence through port 122a and conduit 122. This causes the piston to move toward the rear carrying the platen 51 toward the rear (herein called the forward movement of the carriage). The oil flows from the cylinder 100 through conduit 123 thence through a specially constructed regulating valve 124, presently to be described, thence through conduit 125 into port 126 of the fourway operating valve 118.

The specially constructed valve is a variable flow check valve designated generally by reference character 124 (see Fig. 8). It comprises a body 130 having ports 131 and 132. Within the body 130 is a gate 133 hinged at 134 and designed to engage a seat 135. A deep pitched threaded stem 136 extends through a corresponding threaded opening 137 in the neck 138 of the body of the valve. The neck is threaded to accommodate a ring 139 providing a packing gland in which may be inserted a suitable packing 140. Another closable port 141 provides means for getting to the gate 133 inside the body. The inner end 142 of the stem engages a shoulder 143 on the gate 133. The outside end 144 of the valve stem is provided with a stem arm 145 fixed at one end 146 to the stem. The opposite end of the stem arm has an outwardly extending rod 147 passing through an arcuate slot 148 in a flange 149 fixed to the frame of the machine (see Fig. 1 and Fig. 8). A clamping nut 150 is mounted on the rod.

Hence, by moving the rod 147 in the slot 148 the valve stem 136 is rotated. Thus, the gate 133 may be caused to rest against the end 142 of the stem 136 and prevented from seating when oil passes in the direction of arrow 151 (Fig. 8). Consequently, the rate of flow of oil in the direction of arrow 151 may be varied and controlled since the pressure in the system remains constant by reason of pressure regulator valve 115. Furthermore, the clamping nut 150 is quickly adjustable and accordingly, the rate of movement of the platen is readily controlled in its forward movement. This movement, brought about by moving the handle 119 toward the rear of the machine, causes the oil to flow through the fourway operating valve 118, through conduit 122, causing piston 105 to move in the direction of arrow 152 (Fig. 4). The rate of movement is controlled by the gate 133 since the oil on conduit 123 then is flowing in the direction of arrow 151 (Fig. 8).

When the platen 51 reaches its furthermost inward or forward movement, excess oil may be exhausted through fourway valve 118 through exhaust port 117 through return conduit 116 to the circulating system. It will be noted that the T placed on the work surface will be sawed on the forward movement.

After the tile is sawed, the hand lever 119 of the fourway operating valve is moved toward the front of the machine causing the oil to flow in the opposite direction through the cylinder 100 and the specially constructed variable flow check valve 124. Since the gate 133 will open freely when oil is flowing in the direction of the arrow 153 (Fig. 8), the piston 105 is caused to return very rapidly and with it the platen 51.

Hence, the speed of the platen forwardly may be adjusted to meet tile cutting conditions and the speed will be determined by depth of cut desired, kind and size of tile, etc. Moreover, the platen may be returned very quickly after the tile is sawed, thus resulting in great saving of time. Consequently, uniformity of operation with consequent saving of undesirable wear and tear on the machine, which otherwise would result, is effected.

In addition to the oil system, a water circulating system is provided operating from the same electric motor 110. Armature shaft 160 is connected through clutch 161 to the drive shaft 162 of a rotary pump 163. This pump takes suction from storage tank 164 through conduit 165. The water is discharged from the pump 163 through conduit 166. A pressure regulator valve 167 in this line may be adjusted to maintain a desired pressure through conduit 168 connected with an adjustable nozzle 169 fixed to motor casing 24. A valve 170 is provided to turn on and shut off the water to the nozzle. The nozzle 169 is adjusted to throw water for cooling the rotating saw and to keep down undesirable dust. Excess water from the pressure regulator valve 167 may be discharged through conduit 171 into a collecting pan 172 fixed in the base of the machine.

The water discharged from nozzle 169 after serving its purpose of cooling the cutting surfaces, flows from the work piece surface, and aided by splash guard 89 is carried into the trough 55 of the carriage from which it drains through drain pipe 173 into collecting pan 172. Then the water, carrying dust from the sawing operation, may gravitate into a lower level settling tank 174 through conduit 175 where substantially all of the dust settles out and practically clear water overflows through port 176 into storage tank 164. This arrangement has been found in practice to eliminate entirely the dust nuisance usually encountered in and around tile sawing operations.

A typical tile sawing operation will comprise adjustment of the height of the rotary cutter to accommodate the particular size of tile which may be of the glazed or finished face type, as shown in Fig. 2. The tile T is placed face up on the work piece surface 54 and buttressed against the back stop 90 and clamped on the platen in proper place according to measurement. The scale 91 may be used if desired for proper measurement. Ordinarily it will suffice to saw a groove of approximately one-half to three-fourths inch in depth. When so adjusted, the platen is caused to move forward, at the desired speed which will be regulated by adjusting and clamping the stem arm 145. The forward movement is brought about by moving handle 119 forward. The tile will encounter the rotating saw 21 which, it will be understood, is caused to rotate by motor 28. Simultaneously, motor 110 causes circulation of oil and the water.

After the desired groove is cut in the tile T, the platen will return quickly, the lever 181 may be lifted, the sawed tile removed and the operation repeated as desired by inserting tile to be cut under the hold-down device.

It is usually necessary only to cut a shallow groove in the face of the tile after which the mason, by a single stroke of his hammer, may divide the tile leaving a finished edge on the face corresponding to the other edges of the tile. However, if desired, a deeper groove may be sawed, it being understood, of course, that the operation will be carried on to meet conditions existing in the field where the work is done.

While certain novel features of the invention have been disclosed and are pointed out in the annexed claims, it will be understood that various omissions, substitutions and changes may be made by those skilled in the art without departing from the spirit of the invention.

What is claimed is:

1. In a tile sawing machine of the character described, a pair of channels providing trackways having upper and lower bearing surfaces, and a carriage mounted for reciprocating movement along said trackways, said carriage comprising a work supporting top, legs depending therefrom, a pair of oppositely disposed front wheels mounted on said legs near the front end of said carriage, a pair of oppositely disposed rear wheels mounted on said legs near the rear end of said carriage, said wheels riding on said lower bearing surfaces, a pair of oppositely disposed upwardly extending slots in said legs intermediate said front and rear wheels, a shaft mounted in each of said slots, and a wheel mounted on each of said shafts providing a pair of oppositely disposed intermediate wheels, said shafts being vertically adjustable in said slots whereby said intermediate wheels may be positioned to ride on said upper bearing surfaces and prevent vertical play of said carriage when reciprocated.

2. In a machine for sawing tile of the character described including a frame, a carriage having a work supporting surface, a plurality of pairs of oppositely disposed wheels mounted for rotation on said carriage, a pair of channels transverse of said frame providing trackways having a pair of upper and a pair of lower bearing surfaces for reciprocating movement of said carriage, two pairs of said wheels riding on said lower bearing surfaces and another pair of said wheels disposed intermediate said two pairs riding on said upper bearing surfaces, said intermediately disposed pair of wheels being vertically adjustable on said carriage to insure engagement of all of said wheels with their respective bearing surfaces whereby to prevent vertical play of said carriage, and means including laterally extending members mounted on said carriage adjustable for preventing sidewise play of said carriage.

3. In a tile sawing machine of the character described, a pair of parallel trackways having upper and lower bearing surfaces and a carriage mounted for reciprocating movement along said trackways, said carriage comprising a work supporting top, a pair of front wheels and a pair of rear wheels rotatably mounted on said carriage and riding on said lower bearing surfaces, another pair of oppositely disposed, vertically adjustable wheels rotatably mounted on said carriage and adjusted to ride on said upper bearing surfaces to insure engagement of all of said wheels with their respective bearing surfaces whereby to prevent vertical play of said carriage when reciprocated along said trackways, outwardly extending, laterally adjustable members mounted on said carriage engaging said trackways to prevent sidewise play of said carriage when reciprocated along said trackways, and means connected to said carriage to provide reciprocal movement thereof.

4. In a tile sawing machine of the character described, a pair of channels mounted in the frame of said machine providing trackways having upper and lower bearing surfaces, a carriage mounted for reciprocating movement along said trackways, said carriage comprising a work supporting top, a pair of oppositely disposed front wheels mounted on said carriage and a pair of oppositely disposed rear wheels mounted on said carriage riding on said lower bearing surfaces, a pair of vertically adjustable, oppositely disposed wheels on said carriage intermediate said front and rear wheels and riding on said upper bearing surfaces providing adjustable wheel means for preventing vertical play of said carriage when reciprocated, and an angularly adjustable backstop mounted on said carriage to facilitate the sawing of tile along a line at an angle to the normal edge of the tile.

5. In a machine of the character described, a pair of trackways each having upper and lower bearing surfaces, a carriage mounted for reciprocating movement along said trackways, said carriage including a work supporting top, a pair of oppositely disposed front wheels rotatably mounted on said carriage and a pair of oppositely disposed rear wheels rotatably mounted on said carriage riding on said lower bearing surfaces, a pair of vertically adjustable, oppositely disposed wheels rotatably mounted on said carriage intermediate said front and rear wheels riding on said upper bearing surfaces and providing adjustable means for preventing vertical play of said carriage when reciprocated, and an hydraulically operated piston rod directly connected to said carriage operative to reciprocate said carriage along said trackways.

WILLIAM W. PEARSON.